US007666558B2

(12) United States Patent
Iftime et al.

(10) Patent No.: US 7,666,558 B2
(45) Date of Patent: Feb. 23, 2010

(54) INKLESS REIMAGEABLE PRINTING PAPER AND METHOD

(75) Inventors: Gabriel Iftime, Mississauga (CA); Peter M. Kazmaier, Mississauga (CA); Tyler B. Norsten, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/762,153

(22) Filed: Jun. 13, 2007

(65) Prior Publication Data

US 2008/0311491 A1 Dec. 18, 2008

(51) Int. Cl.
G03F 7/00 (2006.01)
G03F 7/004 (2006.01)
(52) U.S. Cl. .................. 430/19; 430/270.1; 430/905
(58) Field of Classification Search .............. 430/270.1, 430/19, 905
See application file for complete search history.

(56) References Cited

U.S. PATENT DOCUMENTS

| | | | |
|---|---|---|---|
| 3,825,427 A | 7/1974 | Inoue et al. | |
| 3,877,941 A | 4/1975 | Lohmann | |
| 3,961,948 A | 6/1976 | Saeva | |
| 4,425,161 A | 1/1984 | Shibahashi et al. | |
| 4,598,035 A | 7/1986 | Usami et al. | |
| 4,659,649 A | 4/1987 | Dickinson et al. | |
| 4,931,337 A | 6/1990 | Miyazaki et al. | |
| 5,124,236 A | 6/1992 | Yamaguchi et al. | |
| 5,262,280 A | 11/1993 | Knudsen et al. | |
| 5,376,511 A | 12/1994 | Tatezono et al. | |
| 5,468,874 A | 11/1995 | Sugai et al. | |
| 5,677,107 A | 10/1997 | Neckers | |
| 5,691,100 A | 11/1997 | Kudo et al. | |
| 5,691,395 A | 11/1997 | Knudsen et al. | |
| 5,747,225 A | 5/1998 | Manico et al. | |
| 6,067,185 A | 5/2000 | Albert et al. | |
| 6,103,378 A | 8/2000 | Yao et al. | |
| 6,200,646 B1 | 3/2001 | Neckers et al. | |
| 6,528,221 B2 | 3/2003 | Takezawa et al. | |
| 6,579,662 B1 | 6/2003 | Zheng et al. | |
| 6,680,281 B2 | 1/2004 | Tajiri et al. | |
| 6,761,758 B2 | 7/2004 | Boils-Boissier et al. | |
| 6,866,981 B2 | 3/2005 | Furukawa et al. | |
| 6,867,408 B1 * | 3/2005 | Gu et al. ................. | 250/201.5 |
| 6,906,118 B2 | 6/2005 | Goodbrand et al. | |
| 7,018,714 B2 | 3/2006 | Kobayashi et al. | |
| 7,057,054 B2 | 6/2006 | Irie et al. | |
| 7,205,088 B2 | 4/2007 | Iftime et al. | |
| 7,214,456 B2 | 5/2007 | Iftime et al. | |
| 7,229,740 B2 | 6/2007 | Iftime et al. | |
| 7,256,921 B2 | 8/2007 | Kumar et al. | |
| 7,332,257 B2 | 2/2008 | Miyako et al. | |
| 7,381,506 B2 | 6/2008 | Iftime et al. | |
| 7,441,887 B2 | 10/2008 | Senga et al. | |
| 2002/0160318 A1 | 10/2002 | Richter et al. | |
| 2003/0130456 A1 | 7/2003 | Kim et al. | |
| 2005/0012998 A1 | 1/2005 | Kumar et al. | |
| 2005/0244744 A1 | 11/2005 | Kazmaier et al. | |
| 2005/0269556 A1 * | 12/2005 | Evans et al. ................. | 252/586 |
| 2006/0001944 A1 | 1/2006 | Chopra et al. | |
| 2006/0222972 A1 | 10/2006 | Chopra et al. | |
| 2006/0222973 A1 | 10/2006 | Iftime et al. | |
| 2006/0236470 A1 | 10/2006 | Sabnis et al. | |
| 2006/0251988 A1 | 11/2006 | Iftime et al. | |
| 2006/0257785 A1 | 11/2006 | Johnson | |
| 2007/0054215 A1 | 3/2007 | Iftime et al. | |
| 2007/0072110 A1 | 3/2007 | Iftime et al. | |
| 2007/0112103 A1 | 5/2007 | Zhou et al. | |

FOREIGN PATENT DOCUMENTS

| | | |
|---|---|---|
| CA | 2 053 094 A1 | 4/1992 |
| DE | 29 06 193 A1 | 8/1980 |
| EP | 1 367 111 | 12/2003 |
| EP | 1 405 891 | 4/2004 |
| EP | 1 591 829 | 11/2005 |
| EP | 1 591 831 | 11/2005 |
| FR | 2774955 | 8/1999 |
| GB | 2 430 257 | 3/2007 |
| JP | 57-136645 | 8/1982 |
| JP | A-61-175087 | 8/1986 |
| JP | A-5-265129 | 10/1993 |
| JP | A-11-30835 | 2/1999 |
| JP | A 11-322739 | 11/1999 |

(Continued)

OTHER PUBLICATIONS

U.S. Appl. No. 11/762,152, filed Jun. 13, 2007, to Iftime et al.
U.S. Appl. No. 11/762,327, filed Jun. 13, 2007, to Iftime et al.
U.S. Appl. No. 11/762,147, filed Jun. 13, 2007, to Iftime et al.
U.S. Appl. No. 11/762,098, filed Jun. 13, 2007, to Iftime et al.
U.S. Appl. No. 11/762,157, filed Jun. 13, 2007, to Iftime et al.
U.S. Appl. No. 11/762,153, filed Jun. 13, 2007, to Iftime et al.
U.S. Appl. No. 11/762,144, filed Jun. 13, 2007, to Kazmaier et al.
U.S. Appl. No. 11/762,150, filed Jun. 13, 2007, to Norsten et al.
U.S. Appl. No. 11/762,107, filed Jun. 13, 2007, to Iftime et al.
U.S. Appl. No. 11/762,176, filed Jun. 13, 2007, to Norsten et al.
U.S. Appl. No. 11/762,307, filed Jun. 13, 2007, to Norsten at al.
U.S. Appl. No. 11/762,159, filed Jun. 13, 2007, to Kazmaier et al.
U.S. Appl. No. 11/762,311, filed Jun. 13, 2007, to Kazmaier et al.

(Continued)

Primary Examiner—Amanda C. Walke
(74) Attorney, Agent, or Firm—Oliff & Berridge, PLC

(57) ABSTRACT

An image forming medium includes a substrate, and an imaging layer coated on or impregnated into the substrate, wherein the imaging layer includes a photochromic polymer, optionally dispersed in a polymeric binder or a phase change binder, the photochromic polymer including a polymer having at least one photochromic unit grafted therein, wherein the imaging layer exhibits a reversible transition between a colorless state and a colored state in response to heat and light and wherein the imaging layer does not exhibit a transition from the colored state to colorless state when heated in the absence of light.

22 Claims, No Drawings

FOREIGN PATENT DOCUMENTS

| | | |
|---|---|---|
| JP | A 2000-256347 | 9/2000 |
| JP | A-2002-179672 | 6/2002 |
| JP | A-2002-240441 | 8/2002 |
| JP | A-2002-285146 | 10/2002 |
| JP | A-2003-255489 | 9/2003 |
| JP | A-2003-255490 | 9/2003 |
| JP | A-2004-039009 | 2/2004 |
| JP | A-2004-045037 | 2/2004 |
| JP | A-2004-091638 | 3/2004 |
| JP | A-2004-149501 | 5/2004 |
| JP | A-2004-256780 | 9/2004 |
| JP | A-2005-082507 | 3/2005 |
| JP | A-2005-250463 | 9/2005 |
| WO | WO 97/31033 | 8/1997 |
| WO | WO 00/16985 A1 | 3/2000 |
| WO | WO 2006/039130 A1 | 4/2006 |
| WO | WO 2007/105699 A1 | 9/2007 |
| WO | WO 2008/043853 A2 | 4/2008 |

OTHER PUBLICATIONS

Wojtyk et al., "Effects of metal ion complexation on the spiropyran-merocyanine interconversion: development of a thermally stable photo-switch," J. Chem. Soc. Chem, Comm., pp. 1703-1704, 1998.

M. Irie, "Diarylethense for Memories and Switches," Chem Reviews, 100, pp. 1685-1716 (2000).

Kentaro Morimitsu et al., "Dithienylethenes With a Novel Photochromic Performance," J. Org. Chem., vol. 67, pp. 4574-4578 (2002).

"Dolch Introduces World's First Ruggedized Notebook with Integrated Printer" available at http://news.thomasnet.com/fullstory/7005/447, pp. 1-4, Feb. 6, 2002.

Masamitsu Shirai et al., "Photoacid and Photobase Generators: Chemistry and Applications to Polymeric Materials," Prog. Polym. Sci. vol. 21, pp. 1-45 (1996).

T. Hirose et al., "Self-Assembly of Photochromic Diarylethenes With Amphiphilic Side Chains: Reversible Thermal and Photochemical Control," J. Org. Chem., 71, pp. 7499-7508 (2006).

T. Norsten et al., "Photoregulation of Fluorescence in a Porphyrinic Dithienylethene Photochrome," J. Am. Chem. Soc., 123(8), pp. 1784-1785 (2001).

Vladimir I. Minkin, "Photo-, Thermo-, Solvato-, and Electrochromic Spiroheterocyclic Compounds," Chemical Reviews, 104, 5, pp. 2751-2776 (2004).

Takayuki Suzuki et al., "Stabilization of the merocyanine form of photochromic compounds in fluoro alcohols is due to a hydrogen bond", Chem. Commun., 2685-2686 (1998).

Ronald F.M. Lange et al., "Supramolecular polymer interactions based on the alternating copolymer of styrene and Maleimide" Macromolecules, 28, 782-783 (1995).

Vladimir I. Minkin et al., "Perimidine spirocyclohexa dienones" in Organic Photochromic and Thermochromic Compounds, V1, Plenum Press, pp. 315-340 (1999).

John Biteau et al., "Photochromism of Spirooxazine-Doped Gels," J. Phys. Chem., 100, 9024-9031(1996).

Leonard J. Prins et al., "Noncovalent Synthesis Using Hydrogen Bonding," Angew. Chem. Int. Ed., 40, 2382-2426 (2001).

Terry M. Cresp et al., "A Synthesis of αβ-Unsaturated Aldehydes," J. Chem. Soc., Perkin Trans., 1, pp. 37-41 (1974).

Elliot Berman et al., "Photochromic Spiropyrans. I. The Effect of Substituents on the Rate of Ring Closure," J. Am. Chem Soc., 81, 5605-5608 (1959).

Sheng-Hua Liu et al., "Synthesis of Negative Photochromic Crowned Spirobenzopyrans," Syn. Commun., 30, 5, 895-902 (2000).

Yu M. Chunaev et al., "Reaction of the Fischer Base With Nitro- and Bromo-Substituted αHydroxycinnamaldehydes," Chem. Heterocycl. Compd., 628-631 (1984).

Kentaro Morimitsu et al., "Thermal Cycloreversion Reaction of a Photochromic Dithienylperfluorocyclopentene with tert-Butoxy Substituents at the Reactive Carbons," The Chemical Society of Japan, 2002, p. 572-573

O.M. Babeshko et al., "Spiro-2H-Oxocines", Khimiya Geterotsiklicheskikh Soedinenii, No. 11, pp. 1490-1492, Nov. 1976.

Samir Kumar Mandal et al., "Titanocene(III) mediated radical cyclizations of epoxides for the synthesis of medium-sixed ethers", Tetrahedron, vol. 63, pp. 11341-11348, 2007.

Sep. 9, 2009 European Office Action issued in European Application No. 08 155 983.3 - 1217.

* cited by examiner

INKLESS REIMAGEABLE PRINTING PAPER AND METHOD

TECHNICAL FIELD

This disclosure is generally directed to a substrate, method, and apparatus for inkless printing on reimageable paper. More particularly, in embodiments, this disclosure is directed to an inkless reimageable printing substrates, such as inkless printing paper utilizing a composition that is imageable and eraseable by heat and light, such as comprising a photochromic polymer, or photochromic materials grafted to a polymer backbone, and which is optionally dispersed in a polymeric binder. Imaging is conducted by applying heat and UV light to the imaging material to cause a color change, and erasing is conducted by applying visible light and optionally heat to the imaging material to reverse the color change. Other embodiments are directed to inkless printing methods using the inkless printing substrates, and apparatus and systems for such printing.

CROSS-REFERENCE TO RELATED APPLICATIONS

Disclosed in commonly assigned U.S. patent application Ser. No. 11/123,163, filed May 6, 2005, is an image forming medium, comprising a polymer, a photochromic compound containing chelating groups embedded in the polymer, and a metal salt, wherein molecules of the photochromic compound are chelated by a metal ion from the metal salt.

Disclosed in commonly assigned U.S. patent application Ser. No. 10/835,518, filed Apr. 29, 2004, is an image forming method comprising: (a) providing a reimageable medium comprised of a substrate and a photochromic material, wherein the medium is capable of exhibiting a color contrast and an absence of the color contrast; (b) exposing the medium to an imaging light corresponding to a predetermined image to result in an exposed region and a non-exposed region, wherein the color contrast is present between the exposed region and the non-exposed region to allow a temporary image corresponding to the predetermined image to be visible for a visible time; (c) subjecting the temporary image to an indoor ambient condition for an image erasing time to change the color contrast to the absence of the color contrast to erase the temporary image without using an image erasure device; and (d) optionally repeating procedures (b) and (c) a number of times to result in the medium undergoing a number of additional cycles of temporary image formation and temporary image erasure.

Disclosed in commonly assigned U.S. patent application Ser. No. 10/834,722, filed Apr. 29, 2004, is a reimageable medium comprising: a substrate; and a photochromic material, wherein the medium is capable of exhibiting a color contrast and an absence of the color contrast, wherein the medium has a characteristic that when the medium exhibits the absence of the color contrast and is then exposed to an imaging light corresponding to a predetermined image to result in an exposed region and a non-exposed region, the color contrast is present between the exposed region and the non-exposed region to form a temporary image corresponding to the predetermined image that is visible for a visible time, wherein the medium has a characteristic that when the temporary image is exposed to an indoor ambient condition for an image erasing time, the color contrast changes to the absence of the color contrast to erase the temporary image in all of the following: (i) when the indoor ambient condition includes darkness at ambient temperature, (ii) when the indoor ambient condition includes indoor ambient light at ambient temperature, and (iii) when the indoor ambient condition includes both the darkness at ambient temperature and the indoor ambient light at ambient temperature, and wherein the medium is capable of undergoing multiple cycles of temporary image formation and temporary image erasure.

Disclosed in commonly assigned U.S. patent application Ser. No. 11/220,803, filed Sep. 8, 2005, is an image forming medium, comprising: a substrate; and an imaging layer comprising a photochromic material and a polymer binder coated on said substrate, wherein the photochromic material exhibits a reversible homogeneous-heterogeneous transition between a colorless state and a colored state in the polymer binder.

Disclosed in commonly assigned U.S. patent application Ser. No. 11/220,572, filed Sep. 8, 2005, is an image forming medium, comprising: a substrate; and a mixture comprising a photochromic material and a solvent wherein said mixture is coated on said substrate, wherein the photochromic material exhibits a reversible homogeneous-heterogeneous transition between a colorless state and a colored state in the solvent.

Disclosed in commonly assigned U.S. patent application Ser. No. 11/123,163, filed May 6, 2005, is an image forming medium, comprising a polymer; and a photochromic compound containing chelating groups embedded in the polymer; and a metal salt; wherein molecules of the photochromic compound are chelated by a metal ion from the metal salt.

Disclosed in commonly assigned U.S. patent application Ser. No. 11/093,993, filed Mar. 20, 2005, is a reimageable medium, comprising: a substrate having a first color; a photochromic layer adjacent to the substrate; a liquid crystal layer adjacent to the photochromic layer, wherein the liquid crystal layer includes a liquid crystal composition; and an electric field generating apparatus connected across the liquid crystal layer, wherein the electric field generating apparatus supplies a voltage across the liquid crystal layer.

Disclosed in commonly assigned U.S. patent application Ser. No. 10/834,529, filed Apr. 29, 2004, is a reimageable medium for receiving an imaging light having a predetermined wavelength scope, the medium comprising: a substrate; a photochromic material capable of reversibly converting among a number of different forms, wherein one form has an absorption spectrum that overlaps with the predetermined wavelength scope; and a light absorbing material exhibiting a light absorption band with an absorption peak, wherein the light absorption band overlaps with the absorption spectrum of the one form.

The entire disclosure of the above-mentioned applications are totally incorporated herein by reference.

BACKGROUND

Inkjet printing is a well-established market and process, where images are formed by ejecting droplets of ink in an image-wise manner onto a substrate. Inkjet printers are widely used in home and business environments, and particularly in home environments due to the low cost of the inkjet printers. The inkjet printers generally allow for producing high quality images, ranging from black-and-white text to photographic images, on a ride range of substrates such as standard office paper, transparencies, and photographic paper.

However, despite the low printer costs, the cost of replacement inkjet cartridges can be high, and sometimes higher than the cost of the printer itself. These cartridges must be replaced frequently, and thus replacement costs of the ink cartridges is a primary consumer complaint relating to inkjet printing. Reducing ink cartridge replacement costs would thus be a significant enhancement to inkjet printing users.

In addition, many paper documents are promptly discarded after being read. Although paper is inexpensive, the quantity of discarded paper documents is enormous and the disposal of these discarded paper documents raises significant cost and environmental issues. Accordingly, there is a continuing desire for providing a new medium for containing the desired image, and methods for preparing and using such a medium.

In aspects thereof it would be desirable to be reusable, to abate the cost and environmental issues, and desirably also is flexible and paper-like to provide a medium that is customarily acceptable to end-users and easy to use and store.

Although there are available technologies for transient image formation and storage, they generally provide less than desirable results for most applications as a paper substitute. For example, alternative technologies include liquid crystal displays, electrophoretics, and gyricon image media. However, these alternative technologies may not in a number of instances provide a document that has the appearance and feel of traditional paper, while providing the desired reimageability.

Imaging techniques employing photochromic materials, that is materials which undergo reversible or irreversible photoinduced color changes are known, for example, U.S. Pat. No. 3,961,948 discloses an imaging method based upon visible light induced changes in a photochromic imaging layer containing a dispersion of at least one photochromic material in an organic film forming binder.

These and other photochromic (or reimageable or electric) papers are desirable because they can provide imaging media that can be reused many times, to transiently store images and documents. For example, applications for photochromic based media include reimageable documents such as, for example, electronic paper documents. Reimageable documents allow information to be kept for as long as the user wants, then the information can be erased or the reimageable document can be re-imaged using an imaging system with different information.

Although the above-described approaches have provided reimageable transient documents, there is a desire for reimageable paper designs that provide longer image life-times, and more desirable paper-like appearance and feel. For example, while the known approaches for photochromic paper provide transient visible images, the visible images are very susceptible to UV, such as is present in both ambient interior light and more especially in sun light, as well as visible light. Due to the presence of this UV and visible light, the visible images are susceptible to degradation by the UV light, causing the unimaged areas to darken and thereby decrease the contrast between the desired image and the background or unimaged areas.

That is, a problem associated with transient documents is the sensitivity of the unimaged areas to ambient UV-VIS light (such as <420 nm) where the photochromic molecule absorbs. Unimaged areas become colored after a period of time, decreasing the visual quality of the document, because the contrast between white and colored state is reduced. One approach, described in the above-referenced U.S. patent application Ser. No. 10/834,529, is to stabilize the image against light of wavelength <420 nm by creating a band-pass window for the incident light capable of isomerising (i.e. inducing coloration) in the material, centered around 365 nm. However, the unimaged areas of the documents still are sensitive to UV-VIS light of wavelength centered around 365 nm.

Another problem generally associated with known transient documents is that the color change process even for writing can be slow. That is, due to molecular geometry in the coated substrate, it may be difficult for the photochromic material to change orientation from a colorless state to a colored state, or vice versa, quickly. As a result, the writing process may be slowed, requiring application of longer writing exposure.

SUMMARY

It is desirable for some uses that an image formed on a reimageable medium such as a transient document remains stable for extended time periods, without the image or image contrast being degraded by exposure to ambient UV light. However, it is also desired that the image can be erased when desired, to permit reimaging of the medium. It is also desired that the writing and erasing processes be quick, with the photochromic material changing states as quickly as possible under application of the suitable writing or erasing exposure. Electronic paper documents should maintain a written image for as long as the user needs to view it, without the image being degraded by ambient light. The image may then be erased or replaced with a different image by the user on command.

The present disclosure addresses these and other needs, in embodiments, by providing a reimageable image forming medium utilizing a composition that is both imageable and eraseable by heat and light, and which comprises a photochromic polymer, or photochromic materials grafted to a polymer backbone, and which is optionally dispersed in a polymeric binder. Imaging is conducted by applying heat and UV light to the imaging material to cause a color change, and erasing is conducted by applying visible light and optionally heat to the imaging material to reverse the color change. The present disclosure in other embodiments provides an inkless printing method using the reimageable inkless printing substrates, and apparatus and systems for such printing.

The present disclosure thereby provides a printing media, method, and printer system for printing images without using ink or toner. The paper media has a special imageable composition and it is printed and can be erased with light and heat. The paper media thus allows image formation and erasure using a printer that does not require ink or toner replacement, and instead images the paper using a UV light source, such as a LED.

In an embodiment, the present disclosure provides a reimageable image forming medium, comprising
a substrate; and
an imaging layer coated on or impregnated into said substrate, wherein the imaging layer comprises a photochromic polymer, optionally dispersed in a polymeric binder, the photochromic polymer comprising a polymer having a photochromic unit grafted therein;
wherein the imaging layer exhibits a reversible transition between a colorless state and a colored state in response to heat and light, and
wherein the imaging layer does not exhibit a transition from the colored state to colorless state when heated in the absence of light.

In another embodiment, the present disclosure provides a method of making a reimageable image forming medium, comprising applying an imaging layer composition to a substrate, wherein the imaging layer comprises a photochromic polymer, optionally dispersed in a polymeric binder, the photochromic polymer comprising a polymer having a photochromic unit grafted therein;
wherein the imaging layer exhibits a reversible transition between a colorless state and a colored state in response to heat and light, and
wherein the imaging layer does not exhibit a transition from the colored state to colorless state when heated in the absence of light.

In another aspect, the present disclosure provides a method of forming an image, comprising:
providing an image forming medium comprising:
a substrate; and
an imaging layer coated on or impregnated into said substrate, wherein the imaging layer comprises a photochromic polymer, optionally dispersed in a polymeric binder, the photochromic polymer comprising a polymer having a photochromic unit grafted therein;
heating the photochromic polymer to a temperature at or near a glass transition temperature or melting temperature of the photochromic polymer; and exposing the image forming medium to UV irradiation of a first wavelength in an imagewise manner, wherein the imaging layer exhibits a reversible transition between a colorless state and a colored state in response to heat and light, and wherein the imaging layer does not exhibit a transition from the colored state to colorless state when heated in the absence of light.

The imaging method can be conducted, for example, using an imaging system, comprising:

the above image forming medium;

a printer comprising:

a heater for heating the photochromic material, and two irradiation sources, wherein one irradiation source sensitizes the photochromic polymer to convert the imaging layer from a colorless state to a colored state the other irradiation source converts the imaging layer from a colored state to a colorless state.

DETAILED DESCRIPTION OF EXEMPLARY EMBODIMENTS

Generally, in various exemplary embodiments, there is provided an inkless reimageable paper or image forming medium formed using a composition that is imageable and eraseable by heat and light, such as comprising a photochromic polymer, optionally dispersed in a polymeric binder. Exposing the imaging layer to UV light and heat causes the photochromic polymer to easily convert from the colorless state to a colored state, followed by locking in the colored state when the heat and light is removed. Likewise, exposing the imaging layer to visible light and optional heat causes the photochromic polymer to easily convert from the colored state to the colorless state, followed by locking in the colorless state when the heat and light is removed. The heating generally provides higher mobility for the photochromic component, which is required for geometrical changes needed for the isomerization process responsible for switching between the colored and colorless states. The composition thus exhibits a reversible transition between a clear state and a colored state in the image forming medium. By a colored state, in embodiments, refers to for example, the presence of visible wavelengths; likewise, by a colorless state, in embodiments, refers to for example, the complete or substantial absence of visible wavelengths.

In embodiments, the image forming medium generally comprises an imaging layer coated on or impregnated in a suitable substrate material, or sandwiched or laminated between a first and a second substrate material (i.e., a substrate material and an overcoat layer).

The imaging layer can include any suitable photochromic polymer, or photochromic materials grafted to a polymer backbone, and which is optionally dispersed in a polymeric binder. The photochromic polymer generally is any suitable polymer having a suitable photochromic material or unit grafted to a base polymer backbone, where the photochromic material can be included either in the main polymer chain or in side chains or branches of the polymer. The photochromic material and polymer are selected such that when in the grafted state, the photochromic material can readily switch from a first clear or colorless state to a second colored state upon exposure to heat and light such as UV light, and can readily switch from the second colored state back to the first clear or colorless state upon exposure to light such as visible light and optionally heat. The color state change in embodiments is reversible, and thus the image can be "erased" and the image forming medium returned to a blank state.

In embodiments, any suitable composition can be used for forming the imaging layer. For example, the imaging layer can comprise a photochromic polymer, or photochromic materials grafted to a polymer backbone, and which is optionally dispersed in a polymeric binder. The active imaging materials can be dispersed in any suitable medium for forming the imaging layer, such as being dispersed in a solvent, a solution, a polymer binder, or the like; provided in the form of microencapsulated materials; incorporated in an enclosed matrix to hold the imaging composition in place; and the like. In embodiments, the image forming reaction can be reversible an almost unlimited number of times, because the isomerization changes between the clear and colored states do not consume the materials over time.

Any suitable photochromic material can be used and incorporated into the polymer, where the photochromic material exhibits the required color change upon exposure to heat and light. The photochromic material may exhibit photochromism, which is a reversible transformation of a chemical species induced in one or both directions by absorption of an electromagnetic radiation between two forms having different absorption spectra. The first form is thermodynamically stable and may be induced by absorption of light such as ultraviolet light to convert to a second form. The reverse reaction from the second form to the first form may occur, for example, thermally, or by absorption of light such as visible light, or both. Various exemplary embodiments of the photochromic material may also encompass the reversible transformation of the chemical species among three or more forms in the event it is possible that reversible transformation occurs among more than two forms. The photochromic material of embodiments may be composed of one, two, three, four, or more different types of photochromic materials, each of which has reversibly interconvertible forms. As used herein, the term "photochromic material" refers to all molecules of a specific species of the photochromic material, regardless of their temporary isomeric forms. For example, where the photochromic material is the species spiropyran, which exhibits isomeric forms as spiropyran and merocyanine, at any given moment the molecules of the photochromic material may be entirely spiropyran, entirely merocyanine, or a mixture of spiropyran and merocyanine. In various exemplary embodiments, for each type of photochromic material, one form may be colorless or weakly colored and the other form may be differently colored.

The photochromic material may be any suitable photochromic material that is useful in providing photochromic paper including, for example, organic photochromic materials. Examples of photochromic materials include spiropyrans and related compounds like spirooxazines and thiospiropyrans, benzo and naphthopyrans (chromenes), stilbene, azobenzenes, bisimidazols, spirodihydroindolizines, quinines, perimidinespirocyclohexadienones, viologens, fulgides, fulgimides, diarylethenes, hydrazines, anils, aryl disulfides, aryl thiosulfonates and the like. In the aryl disulfides and aryl thiosulfonates, suitable aryl groups include phenyl, naphthyl, phenanthrene, anthracene, substituted groups thereof, and the like. These materials can variously undergo heterocyclic cleavage, such as spiropyrans and related compounds; undergo homocyclic cleavage such as hydrazine and aryl disulfide compounds; undergo cis-trans isomerization such as azo compounds, stilbene compounds and the like; undergo proton or group transfer phototautomerism such as photochromic quinines; undergo photochromism via electro transfer such as viologens; and the like. Specific examples of materials include:

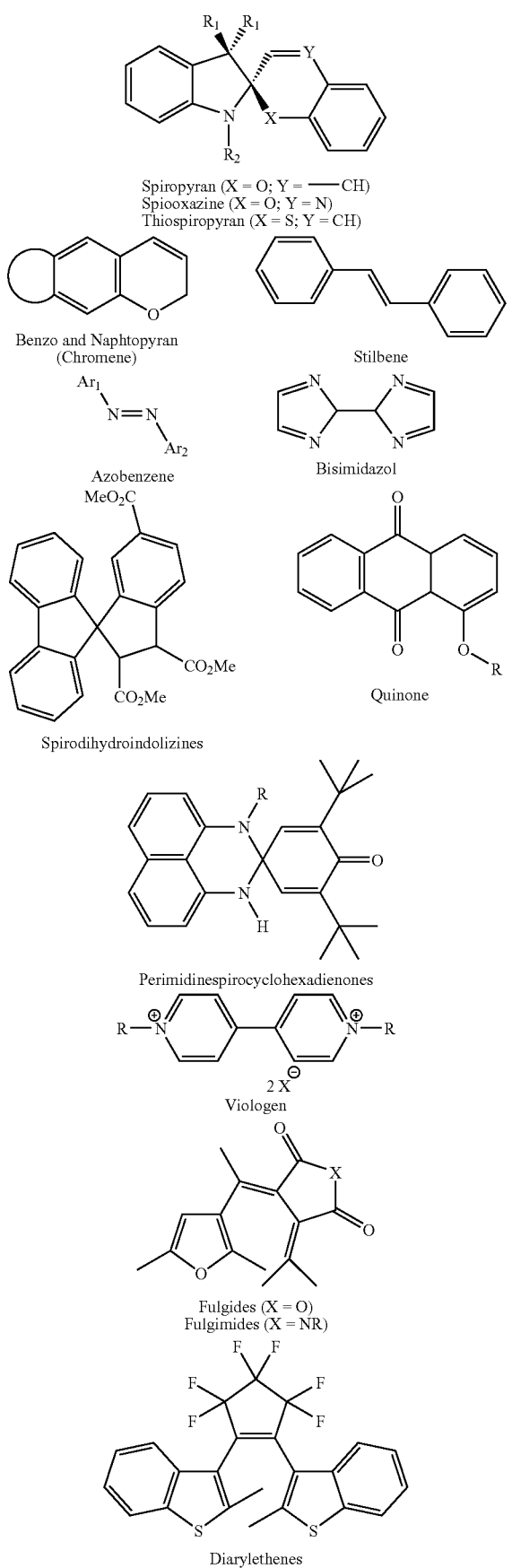
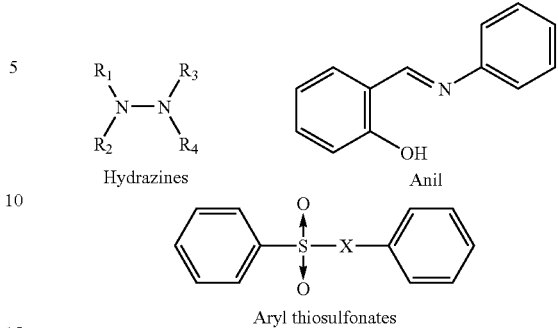

In these structures, the various R groups (i.e., R, $R_1$, $R_2$, $R_3$, $R_4$) can independently be any suitable group including but not limited to hydrogen; alkyl, such as methyl, ethyl, propyl, butyl, and the like, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC≡C-CH_2-$), and the like, where for each of the foregoing, the alkyl group has from 1 to about 50 or more carbon atoms, such as from 1 to about 30 carbon atoms; aryl, including phenyl, naphthyl, phenanthrene, anthracene, substituted groups thereof, and the like, and having from about 6 to about 30 carbon atoms such as from about 6 to about 20 carbon atoms; arylalkyl; such as having from about 7 to about 50 carbon atoms such as from about 7 to about 30 carbon atoms; silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 50 carbon atoms such as from 1 to about 30 carbon atoms; aryloxy groups, such as having from about 6 to about 30 carbon atoms such as from about 6 to about 20 carbon atoms; alkylthio groups, such as having from 1 to about 50 carbon atoms such as from 1 to about 30 carbon atoms; arylthio groups, such as having from about 6 to about 30 carbon atoms such as from about 6 to about 20 carbon atoms; aldehyde groups; ketone groups; ester groups; amide groups; carboxylic acid groups; sulfonic acid groups; and the like. The alkyl, aryl, and arylalkyl groups can also be substituted with groups such as, for example, silyl groups; nitro groups; cyano groups; halide atoms, such as fluoride, chloride, bromide, iodide, and astatide; amine groups, including primary, secondary, and tertiary amines; hydroxy groups; alkoxy groups, such as having from 1 to about 20 carbon atoms such as from 1 to about 10 carbon atoms; aryloxy groups, such as having from about 6 to about 20 carbon atoms such as from about 6 to about 10 carbon atoms; alkylthio groups, such as having from 1 to about 20 carbon atoms such as from 1 to about 10 carbon atoms; arylthio groups, such as having from about 6 to about 20 carbon atoms such as from about 6 to about 10 carbon atoms; aldehyde groups; ketone groups; ester groups; amide groups; carboxylic acid groups; sulfonic acid groups; and the like. $Ar_1$ and $Ar_2$ can independently be any suitable aryl or aryl-containing group including but not limited to phenyl, naphthyl, phenanthrene, anthracene, and the like, and substituted groups thereof including any of the substitutions mentioned above for the alkyl, aryl, and arylalkyl groups. X in the spiropyran formula is a suitable heteroatom such as N, O, S, and the like. Y can be $-N-$ or $-CH-$. $X^-$ in the Viologen formula can be, for example, $F^-$, $Cl^-$, $Br^-$, $I^-$, $BF_4^-$, $PF_6^-$, $B(C_6H_5)_4^-$ and the like. $X^-$ in the aryl thiosulfonate can be, for example, $-O-$, $S$, $-NH-$ and the like.

In embodiments, because the photochromic material is grafted to a polymer chain, it is desired that the photochromic material be selected such that it exhibits sufficient mobility under heat and light irradiation to convert from one of the colored or colorless form to the other. For example, in some photochromic papers, small molecule photochromic materials are simply dispersed in a polymeric binder. For this reason, there is enough mobility of the molecules to undesirably or prematurely relax back from the colored state to the clear state over time. This fading reaction requires geometrical change, which in turn is made easier by increased mobility in the medium. In order to significantly slow down the fading and thus provide a longer-lasting image, it is desired to reduce mobility of the photochromic material. Accordingly, in embodiments, the polymeric photochromic material is used. Because the photochromic material is attached to the polymeric chain, the mobility of the photochromic material is reduced, as a result, the undesired fading reaction is significantly slowed down or eliminated. However, in a high viscosity media (like a polymer at a temperature below its glass transition temperature) the coloration reaction is also slow, making the writing process difficult. For this reason, in embodiments, increased mobility of the photochromic material is provided by application of heat along with the UV irradiation. This provides fast writing.

However, because heat is used for writing and optionally for erasing, it is desired in embodiments that the photochromic material be thermally stable. That is, it is desired in embodiments that the application of heat alone to the photochromic polymer does not cause the photochromic material to switch between the different colored and clear states. For example, the common photochromic material spiropyran is not thermally stable. This material fades from its colored state when heated. Accordingly, suitable thermally stable photochromic materials that can be used in these embodiments include, for example, diarylethene and fulgide photochromic materials. Exemplary structures of these photochromic materials, and how they change state, are shown below:

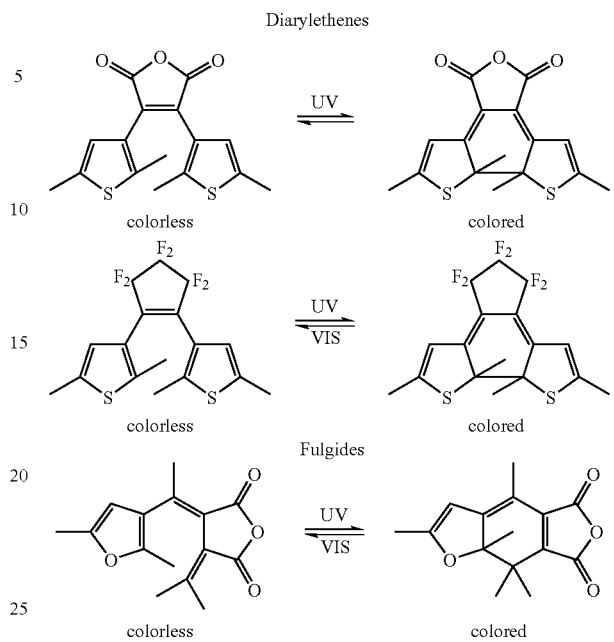

The photochromic material is grafted to a polymer chain, where the grafting can be either in the main (base) polymer chain or backbone, or in side chains attached to the main polymer chain, or both. In addition, in embodiments, individual polymer chains can include one or more photochromic units, and can include one or more different types of photochromic units. Accordingly, exemplary depictions of photochromic materials grafted to a polymer chain are shown below:

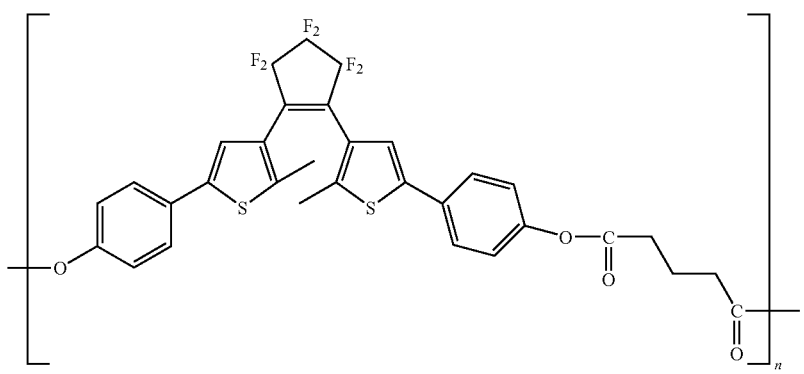

Diarylethene polymer

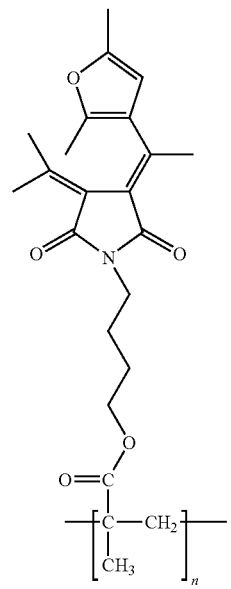

Fulgide polymer where n represents a number of repeating units of the polymer chain, and can range from 1 to about 1,000 or more, such as from about 5 to about 200.

Any suitable polymeric backbone may be used as the chain forming the polymer-containing photochromic material. Polymers can be synthesized by known methods. For example, one suitable method consists in polymerization of a monomer containing the photochromic group attached to a polymerizable group. Two types of polymers can be obtained by using this method: attached photochromic groups to the polymer backbone and main chain polymers containing the photochromic group in the main chain. Side chain polymers can be synthesized by using polymerizable groups that include but are not limited to acrylic, methacrylic double or triple bonds. Specific examples of polymerizable groups include $H_2C=CH-C(O)-O-$ (acryl), $H_2C=C(CH_3)-C(O)-O-$ (methacryl), $H_2C=C(C_2H_5)-C(O)-O-$ (ethacryl), $-CH=CH_2$ (vinyl), and $-C(CH_3)=CH_2$ and the like. For example, the fulgide polymer shown above, is obtained by polymerization of the monomer Fulgide-OOC—$C(CH_3)=CH_2$ monomer in presence of radical initiators like AIBN. Main chain polymers can be synthesized, for example, by condensation reactions between a di-functional molecule containing the photochromic group and a second di-functional molecule. Typical condensation reactions, usable for fabrication of these materials include esterification, amide formation, ether formation and other. For example, the diarylethene polymer shown above is obtained by condensation between the HO-Diarylethene-OH with a carboxylic adi-acid, HOOC—(CH2)3-COOH. These synthetic procedures are well known to those skilled in the art of polymerization.

Another suitable method consists on post-functionalization of an already formed polymeric chain. In this process, the photochromic compound is chemically attached to the main chain or side chain froups of the preformed polymer chain. For example, an usable photochromic polymer can be obtained by reacting polyacrylic acid polymer with a suitably alcohol terminated photochromic group. Post-functionalization reactions may be complete or only partial.

Suitable polymers include, but are not limited to, polyalkylacrylates like polymethyl methacrylate (PMMA), polycarbonates, polyethylenes, oxidized polyethylene, polypropylene, polyisobutylene, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, and the like. Copolymer materials such as polystyrene-acrylonitrile, polyethylene-acrylate, vinylidenechloride-vinylchloride, vinylacetate-vinylidene chloride, styrene-alkyd resins are also examples of suitable polymer materials. The copolymers may be block, random, or alternating copolymers. In some embodiments, polymethyl methacrylate or a polystyrene is the polymer chain, in terms of their cost and wide availability.

The image forming materials (photochromic polymer) may optionally be dispersed in any suitable carrier, such as an additional polymer binder.

Both compositions dispersible in either organic polymers or waterborne polymers can be used, depending on the used components. For example, for waterborne compositions, polyvinylalcohol is a suitable application solvent, and polymethylmethacrylate is suitable for organic soluble compositions.

Suitable examples of polymeric binders include, but are not limited to, polyalkylacrylates like polymethyl methacrylate (PMMA), polycarbonates, polyethylenes, oxidized polyethylene, polypropylene, polyisobutylene, polystyrenes, poly (styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, and the like. Copolymer materials such as polystyrene-acrylonitrile, polyethylene-acrylate, vinylidenechloride-vinylchloride, vinylacetate-vinylidene chloride, styrene-alkyd resins are also examples of suitable binder materials. The copolymers may be block, random, or alternating copolymers. In some embodiments, polymethyl methacrylate or a polystyrene is the polymer binder, in terms of their cost and wide availability. These optional polymer binder materials can thus be the same as the base polymer used in forming the photochromic polymer, except that the polymer does not have a photochromic material grafted to the polymer chain, and the optional binder polymer is not chemically bonded to the photochromic polymer. The polymer binder, when used, has the role to provide a coating or film forming composition. However, in embodiments, a separate polymer binder is not needed because the photochromic material is polymeric in itself.

Phase change materials can also be used as the polymer binder. Phase change materials are known in the art, and include for example crystalline polyethylenes such as Polywax® 2000, Polywax® 1000, Polywax® 500, and the like from Baker Petrolite, Inc.; oxidized wax such as X-2073 and Mekon wax, from Baker-Hughes Inc.; crystalline polyethylene copolymers such as ethylene/vinyl acetate copolymers, ethylene/vinyl alcohol copolymers, ethylene/acrylic acid copolymers, ethylene/methacrylic acid copolymers, ethylene/carbon monoxide copolymers, polyethylene-b-polyalkylene glycol wherein the alkylene portion can be ethylene, propylene, butylenes, pentylene or the like, and including the polyethylene-b-(polyethylene glycol)s and the like; crystalline polyamides; polyester amides; polyvinyl butyral; polyacrylonitrile; polyvinyl chloride; polyvinyl alcohol hydrolyzed; polyacetal; crystalline poly(ethylene glycol); poly (ethylene oxide); poly(ethylene therephthalate); poly (ethylene succinate); crystalline cellulose polymers; fatty alcohols; ethoxylated fatty alcohols; and the like, and mixtures thereof.

In embodiments, the imaging composition can be applied in one form, and dried to another form for use. Thus, for example, the imaging composition comprising photochromic polymer and optional binder polymer may be dissolved or dispersed in a solvent for application to or impregnation into a substrate, with the solvent being subsequently evaporated to form a dry layer.

In general, the imaging composition can include the carrier and imaging material in any suitable amounts, such as from about 5 to about 99.5 percent by weight carrier, such as from about 30 to about 70 percent by weight carrier, and from about 0.05 to about 50 percent by weight photochromic polymer imaging material, such as from about 0.1 to about 5 percent photochromic polymer imaging material by weight.

For applying the imaging layer to the image forming medium substrate, the image forming layer composition can be applied in any suitable manner. For example, the image forming layer composition can be mixed and applied with any suitable solvent or polymer binder, and subsequently hardened or dried to form a desired layer. Further, the image forming layer composition can be applied either as a separate distinct layer to the supporting substrate, or it can be applied so as to impregnate into the supporting substrate.

The image forming medium may comprise a supporting substrate, coated or impregnated on at least one side with the imaging layer. As desired, the substrate can be coated or impregnated on either only one side, or on both sides, with the imaging layer. When the imaging layer is coated or impregnated on both sides, or when higher visibility of the image is desired, an opaque layer may be included between the supporting substrate and the imaging layer(s) or on the opposite side of the supporting substrate from the coated imaging layer. Thus, for example, if a one-sided image forming medium is desired, the image forming medium may include a supporting substrate, coated or impregnated on one side with the imaging layer and coated on the other side with an opaque layer such as, for example, a white layer. Also, the image forming medium may include a supporting substrate, coated or impregnated on one side with the imaging layer and with an opaque layer between the substrate and the imaging layer. If a two-sided image forming medium is desired, then the image forming medium may include a supporting substrate, coated or impregnated on both sides with the imaging layer, and with at least one opaque layer interposed between the two coated imaging layers. Of course, an opaque supporting substrate, such as conventional paper, may be used in place of a separate supporting substrate and opaque layer, if desired.

Any suitable supporting substrate may be used. For example, suitable examples of supporting substrates include, but are not limited to, glass, ceramics, wood, plastics, paper, fabrics, textile products, polymeric films, inorganic substrates such as metals, and the like. The plastic may be for example a plastic film, such as polyethylene film, polyethylene terephthalate, polyethylene naphthalate, polystyrene, polycarbonate, polyethersulfone. The paper may be, for example, plain paper such as XEROX® 4024 paper, ruled notebook paper, bond paper, silica coated papers such as Sharp Company silica coated paper, Jujo paper, and the like. The substrate may be a single layer or multi-layer where each layer is the same or different material. In embodiments, the substrate has a thickness ranging for example from about 0.3 mm to about 5 mm, although smaller or greater thicknesses can be used, if desired.

When an opaque layer is used in the image forming medium, any suitable material may be used. For example, where a white paper-like appearance is desired, the opaque layer may be formed from a thin coating of titanium dioxide, or other suitable material like zinc oxide, inorganic carbonates, and the like. The opaque layer can have a thickness of, for example, from about 0.01 mm to about 10 mm, such as about 0.1 mm to about 5 mm, although other thicknesses can be used.

If desired, a further overcoating layer may also be applied over the applied imaging layer. The further overcoating layer may, for example, be applied to further adhere the underlying layer in place over the substrate, to provide wear resistance, to improve appearance and feel, and the like. The overcoating layer can be the same as or different from the substrate material, although in embodiments at least one of the overcoating layer and substrate layer is clear and transparent to permit visualization of the formed image. The overcoating layer can have a thickness of, for example, from about 0.01 mm to about 10 mm, such as about 0.1 mm to about 5 mm, although other thicknesses can be used. However, in embodiments, an overcoating layer is not used, so as to allow easy evaporation of water formed during the imaging step, in a post-imaging heating step. For example, if desired or necessary, the coated substrate can be laminated between supporting sheets such as plastic sheets.

In embodiments where the imaging material is coated on or impregnated into the substrate, the coating can be conducted by any suitable method available in the art, and the coating method is not particularly limited. For example, the imaging material can be coated on or impregnated into the substrate by dip coating the substrate into a solution of the imaging material composition followed by any necessary drying, or the substrate can be coated with the imaging composition to form a layer thereof. Similarly, the protective coating can be applied by similar methods.

In its method aspects, the present disclosure involves providing an image forming medium comprised of a substrate and an imaging layer comprising a photochromic polymer, or photochromic materials grafted to a polymer backbone, and which is optionally dispersed in a polymeric binder, which composition can provided as a dry coating onto or into the substrate. To provide separate writing and erasing processes, imaging is conducted by applying heat and light of a first wavelength, such as UV light, to the imaging material to cause a color change, and erasing is conducted by applying light of a second wavelength, such as visible light, and optionally heat, to the imaging material to reverse the color change. Thus, for example, the imaging layer as a whole could be sensitive at a first (such as UV) wavelength that causes the photochromic material to convert from a clear to a colored state, while the imaging layer as a whole could be sensitive at a second, different (such as visible) wavelength that causes the photochromic material to convert from the colored back to the clear state.

In embodiments, heating is applied to the imaging layer before or at the same time as the light irradiation. The heat raises the temperature of the imaging composition, particularly the photochromic polymer, to raise the mobility of the imaging composition and thus allow easier and faster conversion from one color state to the other. The heating can be applied before or during the irradiation, if the heating causes the imaging composition to be raised to the desired temperature during the irradiation. Any suitable heating temperature can be used, and will depend upon, for example, the specific imaging composition used. For example, where the photochromic polymer is an amorphous polymer having grafted photochromic units, then the heating can be conducted to raise the photochromic polymer to at or near its glass transition temperature, such as within about 10° C., within about 50° C., or within about 100° C. of the glass transition temperature. The heating temperature can be as high as needed as long no chemical degradation of the photochromic polymer backbone or polymer binder occurs. In other embodiments, for example where the photochromic polymer is a phase change composition comprised of a polymer having grafted photochromic units, then the heating can be conducted to raise the photochromic polymer to at or near its melting point, such as within about 5° C., within about 10° C., or within about 20° C. of the melting point, although it is desired in certain embodiments that the temperature not exceed the melting point so as to avoid undesired movement or flow of the photochromic polymer on the substrate.

In a writing process, the image forming medium is exposed to an imaging light having an appropriate activating wavelength, such as a UV light source such as a light emitting diode (LED), in an imagewise fashion, and when the photochromic polymer is at a temperature at or near its glass transition or melting temperature. The imaging light supplies sufficient energy to the photochromic polymer to cause the photochromic unit to convert, such as isomerize, from a clear state to a colored state to produce a colored image at the imaging location. One or both of the amount of energy irradiated on a particular location of the image forming medium or the temperature of the photochromic polymer at the location can affect the intensity or shade of color generated at that location. Thus, for example, a weaker intensity image can be formed by delivering a lesser amount of energy or delivering the energy to a lower temperature photochromic polymer at the location and thus generating a lesser amount of colored photochromic unit, while a stronger intensity image can be formed by delivering a greater amount of energy to the location or delivering the energy to a higher temperature photochromic polymer at the location and thus generating a greater amount of colored photochromic unit. When suitable photochromic polymer and irradiation conditions are selected, the variation in the amount of energy irradiated and polymer temperature at a particular location of the image forming medium can thus allow for formation of grayscale images, while selection of other suitable photochromic materials can allow for formation of full color images.

Once an image is formed by the writing process, the temperature of the photochromic polymer is lowered to lock in the image. That is, when the temperature is lowered, the mobility of the photochromic unit is reduced and thus it can not as easily switch back to the colorless state. Such cooling down from the heated temperature can be conducted by any suitable manner, such as radiational cooling without any added cooling effect, cooling by ambient air flow, or the like. The imaging substrate thus provided a reimageable substrate that exhibits a long-lived image lifetime, but which can be erased as desired and reused for additional imaging cycles.

In an erasing process, the writing process is essentially repeated, except that a different wavelength irradiation light, such as visible light, is used, and when the photochromic polymer is optionally at a temperature at or near its glass transition or melting temperature. The erasing process causes the photochromic unit to convert, such as isomerize, from a colored state to a clear state to erase the previously formed image at the imaging location. The erasing procedure can be on an image-wise fashion or on the entire imaging layer as a whole, as desired. The heating step is optional, in that certain compositions can be provided that are erased upon only exposure to the selected light wavelength, while other compositions can be provided that are more robust or thermally stable and can be erased only upon exposure to the selected light wavelength under a heating condition.

The separate imaging lights used to form the transient image and erase the transient image may have any suitable predetermined wavelength scope such as, for example, a single wavelength or a band of wavelengths. In various exemplary embodiments, the imaging lights are an ultraviolet (UV) light and a visible light each having a single wavelength or a narrow band of wavelengths. For example, the UV light can be selected from the UV light wavelength range of about 200 nm to about 475 nm, such as a single wavelength at about 365 nm or a wavelength band of from about 360 nm to about 370 nm. For forming the image, as well as for erasing the image, the image forming medium may be exposed to the respective imaging or erasing light for a time period ranging from about 10 milliseconds to about 5 minutes, particularly from about 30 milliseconds to about 1 minute. The imaging and erasing light may have an intensity ranging from about 0.1 mW/cm$^2$ to about 100 mW/cm$^2$, particularly from about 0.5 mW/cm$^2$ to about 10 mW/cm$^2$.

In various exemplary embodiments, imaging light corresponding to the predetermined image may be generated for example by a computer or a Light Emitting Diode (LED) array screen and the image is formed on the image forming medium by placing the medium on or in proximity to the LED screen for the desired period of time. In other exemplary embodiments, a UV Raster Output Scanner (ROS) may be used to generate the UV light in an image-wise pattern. This embodiment is particularly applicable, for example, to a printer device that can be driven by a computer to generate printed images in an otherwise conventional fashion. That is, the printer can generally correspond to a conventional inkjet printer, except that the inkjet printhead that ejects drops of ink in the imagewise fashion can be replaced by a suitable UV light printhead that exposes the image forming medium in an imagewise fashion. In this embodiment, the replacement of ink cartridges is rendered obsolete, as writing is conducted using a UV light source. Other suitable imaging techniques that can be used include, but are not limited to, irradiating a UV light onto the image forming medium through a mask, irradiating a pinpoint UV light source onto the image forming medium in an imagewise manner such as by use of a light pen, and the like.

For erasing an image in order to reuse the imaging substrate, in various exemplary embodiments, the substrate can be exposed to a suitable imaging light, to cause the image to be erased. Such erasure can be conducted in any suitable manner, such as by exposing the entire substrate to the erasing light at once, exposing the entire substrate to the erasing light in a successive manner such as by scanning the substrate, or the like. In other embodiments, erasing can be conducted at particular points on the substrate, such as by using a light pen, or the like.

According to various exemplary implementations, the color contrast that renders the image visible to an observer may be a contrast between, for example two, three or more different colors. The term "color" may encompass a number of aspects such as hue, lightness and saturation, where one color may be different from another color if the two colors differ in at least one aspect. For example, two colors having the same hue and saturation but are different in lightness would be considered different colors. Any suitable colors such as, for example, red, white, black, gray, yellow, cyan, magenta, blue, and purple, can be used to produce a color contrast as long as the image is visible to the naked eye of a user. However, in terms of desired maximum color contrast, a desirable color contrast is a dark gray or black image on a light or white background, such as a gray, dark gray, or black image on a white background, or a gray, dark gray, or black image on a light gray background.

In various exemplary embodiments, the color contrast may change such as, for example, diminish during the visible time, but the phrase "color contrast" may encompass any degree of color contrast sufficient to render an image discernable to a user regardless of whether the color contrast changes or is constant during the visible time.

An example is set forth hereinbelow and is illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Example 1

Diarylethene polymer (3) is synthesized by esterification reaction between the diarylethene diphenol (1) and the diacid (2) by standard DCC coupling procedure, known to provide mild conditions for esterification reactions (see for example J. March, Advanced Organic Chemistry, 4$^{th}$ Edition, 1992). The diarylethene diphenol (1) was previously reported in the literature (Kawai, S.-H.; Gilat, S. L.; Ponsinet, R.; Lehn, J. -M. *Chem. Eur. J.* 1995,1, 285.).

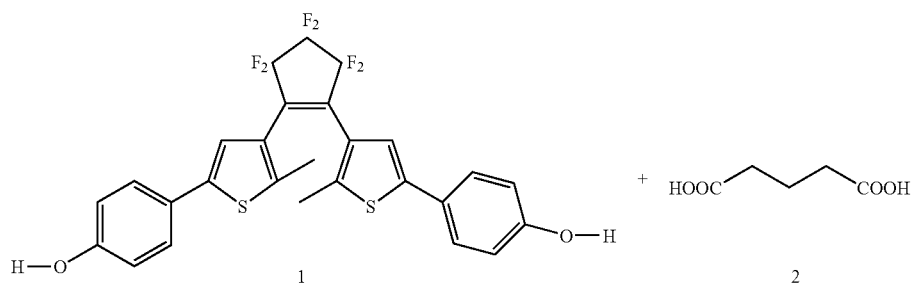

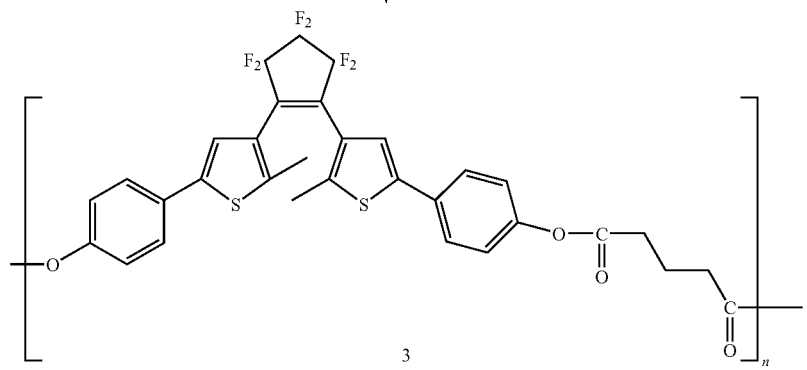

A coating composition is made by dissolving 100 mg of polymer (3) into 2.5 ml of a Polymethylemethacrylate solution containing 125 g PMMA in 1 L of toluene. The composition is stirred to ensure complete dissolution of the photochromic polymer (3). The composition is coated onto Xerox 4024 paper substrate by using a blade, with a gap set at 3 mils. This provides a paper media that is coated on both sides.

The paper is written by exposing desired areas to UV light (365 nm) with simultaneous heating. The heating ensures faster writing. The printed paper is readable for longer than a one day period of time when kept in the ambient room light conditions. For comparison, a non-polymeric small molecule material based switch prepared as described above faded in about 20 hours when kept under ambient room light conditions.

When desired, the paper is erased by exposure to high intensity VIS light, with simultaneous heating.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of forming an image, comprising:
   providing an image forming medium comprising:
      a substrate; and
      an imaging layer coated on or impregnated into said substrate, wherein the imaging layer comprises a photochromic polymer, optionally dispersed in a polymeric binder, the photochromic polymer comprising a polymer having at least one photochromic unit grafted therein; and
   heating the photochromic polymer to a temperature at or near a glass transition temperature or melting temperature of the photochromic polymer; and
   exposing the image forming medium to UV irradiation of a first wavelength in an imagewise manner for a time period ranging from about 10 milliseconds to about 5 minutes at an intensity ranging from about 0.1 mW/cm$^2$ to about 100 mW/cm$^2$ to form a visible image,
   wherein the polymer and the photochromic unit are selected so that:
      the imaging layer exhibits a reversible transition between a colorless state and a colored state in response to heat and light, and
      the imaging layer does not exhibit a transition from the colored state to colorless state when heated in the absence of light.

2. The method of claim 1, further comprising:
   exposing the image forming medium bearing said image to light irradiation of a second wavelength in an imagewise manner, optionally while heating the photochromic polymer to a temperature at or near a glass transition temperature or melting temperature of the photochromic polymer, wherein said light irradiation causes said photochromic polymer to change from the colored state to the colorless state; and
   repeating the step of exposing the image forming medium to the UV irradiation of a first wavelength in an imagewise manner at least one additional time.

3. The method of claim 1, where the heating heats the photochromic polymer to a temperature within about 10° C. of the glass transition temperature or melting temperature of the photochromic polymer.

4. An image forming medium, comprising:
   a substrate; and
   an imaging layer coated on or impregnated into said substrate, the imaging layer comprising a photochromic polymer, optionally dispersed in a polymeric binder, the photochromic polymer comprising a polymer having at least one photochromic unit grafted therein;
wherein the polymer and the photochromic unit are selected so that:
the imaging layer exhibits a reversible transition between a colorless state and a colored state in response to heat and light;
the imaging layer does not exhibit a transition from the colored state to the colorless state when heated in the absence of light; and
the photochromic polymer converts from a colorless state to a colored state upon irradiation with light of a first wavelength and converts from a colored state to a colorless state upon irradiation with light of a second wavelength different from the first wavelength.

5. The image forming medium of claim 4, wherein the photochromic polymer converts from the colorless state to the colored state upon irradiation with light of the first wavelength only when the photochromic polymer is heated to a temperature at or near a glass transition or melting temperature of the photochromic polymer.

6. The image forming medium of claim 4, wherein the photochromic unit is selected from the group consisting of a spiropyran compound, spirooxazine, thiospiropyran, a benzo compound, naphthopyran, stilbene, azobenzene, bisimidazol, spirodihydroindolizine, quinine, perimidinespirocyclohexadienone, viologen, fulgide, fulgimide, diarylethene, hydrazine, anil, aryl disulfide, and aryl thiosulfonate.

7. The image forming medium of claim 4, wherein the photochromic unit is selected from the group consisting of fulgides and diarylethenes.

8. The image forming medium of claim 4, wherein the photochromic unit is grafted into a main chain of said photochromic polymer.

9. The image forming medium of claim 4, wherein the photochromic unit is grafted into a side chain of said photochromic polymer.

10. The image forming medium of claim 4, wherein the photochromic polymer comprises multiple photochromic units grafted therein.

11. The image forming medium of claim 4, wherein the photochromic polymer is thermally stable.

12. The image forming medium of claim 4, wherein the polymer is selected from the group consisting of polyalkylacrylates, polycarbonates, polyethylenes, oxidized polyethylene, polypropylene, polyisobutylene, polystyrenes, poly(styrene)-co-(ethylene), polysulfones, polyethersulfones, polyarylsulfones, polyarylethers, polyolefins, polyacrylates, polyvinyl derivatives, cellulose derivatives, polyurethanes, polyamides, polyimides, polyesters, silicone resins, epoxy resins, polyvinyl alcohol, polyacrylic acid, polystyrene-acrylonitrile, polyethylene-acrylate, vinylidenechioride-vinyichloride, vinylacetate-vinylidene chloride, styrene-alkyd resins, and mixtures thereof.

13. The image forming medium of claim 4, wherein the imaging layer further comprises said polymeric binder.

14. The image forming medium of claim 4, wherein the imaging layer further comprises a phase change binder.

15. The image forming medium of claim 13, wherein said polymer binder is the same as the polymer forming the photochromic polymer but without the photochromic unit.

16. The image forming medium of claim 4, wherein the photochromic polymer is present in an amount of from about 0.01% to about 20% by weight of a total dry weight of the imaging layer.

17. The image forming medium of claim 4, wherein the substrate is selected from the group consisting of glass, ceramic, wood, plastic, paper, fabric, textile, metals, plain paper, and coated paper.

18. The image forming medium of claim 4, wherein the photochromic polymer is a diarylethene polymer of formula (I):

[Formula (1)]

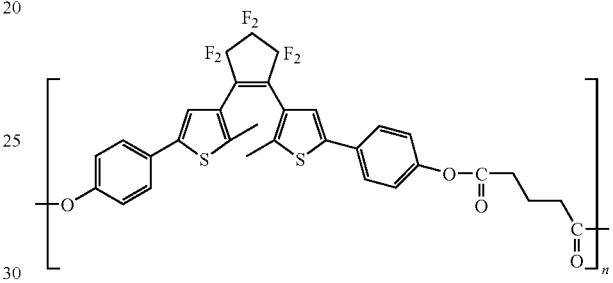

wherein n is greater than 1.

19. A method of making an image forming medium, comprising applying an imaging layer composition to a substrate, wherein the imaging layer composition comprises a photochromic polymer, optionally dispersed in a polymeric binder, the photochromic polymer comprising a polymer having at least one photochromic unit grafted therein;
wherein the polymer and the photochromic unit are selected so that:
the imaging layer exhibits a reversible transition between a colorless state and a colored state in response to heat and light, and
the imaging layer does not exhibit a transition from the colored state to the colorless state when heated in the absence of light.

20. The method of claim 19, wherein the applying comprises coating the imaging layer over the substrate or impregnating the imaging layer into the substrate.

21. The method of claim 19, wherein the imaging layer composition further comprises the polymeric binder.

22. The method of claim 19, wherein the imaging layer composition further comprises the phase change binder.

* * * * *